United States Patent [19]

Smith

[11] Patent Number: 4,475,726

[45] Date of Patent: Oct. 9, 1984

[54] MECHANISM FOR POSITIONING WORKPIECES

[76] Inventor: Richard B. Smith, 4 Bird La., Newport News, Va. 23601

[21] Appl. No.: 303,659

[22] Filed: Sep. 18, 1981

[51] Int. Cl.³ .............................................. B25B 1/20
[52] U.S. Cl. ........................................ 269/41; 29/271; 269/43; 269/93; 269/208; 269/236; 228/49 R; 228/49 C
[58] Field of Search ............... 269/37, 43, 41, 236, 269/235, 215, 208, 49, 214, 91, 93; 228/49 C, 49 R; 29/271

[56] References Cited

U.S. PATENT DOCUMENTS

| | | | |
|---|---|---|---|
| 201,591 | 3/1878 | Breckenridge | 269/236 X |
| 374,264 | 12/1887 | Miller et al. | |
| 669,605 | 3/1901 | Vernon | 269/214 X |
| 945,185 | 1/1910 | Milas | 269/37 |
| 1,141,365 | 6/1915 | Strozier . | |
| 1,309,067 | 7/1919 | Hetzel | 269/49 X |
| 1,475,618 | 11/1923 | Anderson | 269/236 X |
| 1,670,253 | 5/1928 | Gilbert et al. | |
| 2,043,125 | 6/1936 | Stahl | 269/236 |
| 2,359,530 | 10/1944 | Rose . | |
| 2,660,141 | 11/1953 | Thomas . | |
| 2,781,803 | 2/1957 | Nelson | 269/236 X |
| 3,182,988 | 5/1965 | Woodall . | |
| 3,556,508 | 1/1971 | Varga . | |
| 4,021,516 | 5/1977 | Stevenson . | |
| 4,202,540 | 5/1980 | Neff | 269/236 X |

FOREIGN PATENT DOCUMENTS

| | | | |
|---|---|---|---|
| 1046250 | 1/1979 | Canada | 29/271 |
| 979161 | 4/1951 | France | 269/236 |
| 81654 | 12/1919 | Switzerland | 269/236 |
| 682269 | 11/1952 | United Kingdom | 228/49 C |
| 1369296 | 5/1972 | United Kingdom | 228/49 C |

Primary Examiner—Frederick R. Schmidt
Assistant Examiner—Steven P. Schad
Attorney, Agent, or Firm—Geoffrey R. Myers; Darle M. Short

[57] ABSTRACT

A rugged sturdy workpiece positioning mechanism that effectively and efficiently positions and holds at least two workpieces for further operations is provided. The mechanism includes a main support which is slidably connected to a first workpiece and a housing assembly which is affixed to the main support and extends above and engages the second workpiece. The housing assembly includes two side plates, a cam with a handle rotatably attached to the sideplates, a ratchet to lock the cam into a fixed position and a load bearing surface actuated by the cam and slidably received between the side plates. The edge of the cam abuts the load bearing member. When the cam is rotated in a predetermined direction, the distance between its axis of rotation and the load bearing member increases driving the load bearing member downward. The load bearing surface engages the workpiece and forces the second workpiece into a desired position relative to the first workpiece. Once the joining operation is completed, the mechanism is slidably detached from the workpieces.

18 Claims, 7 Drawing Figures

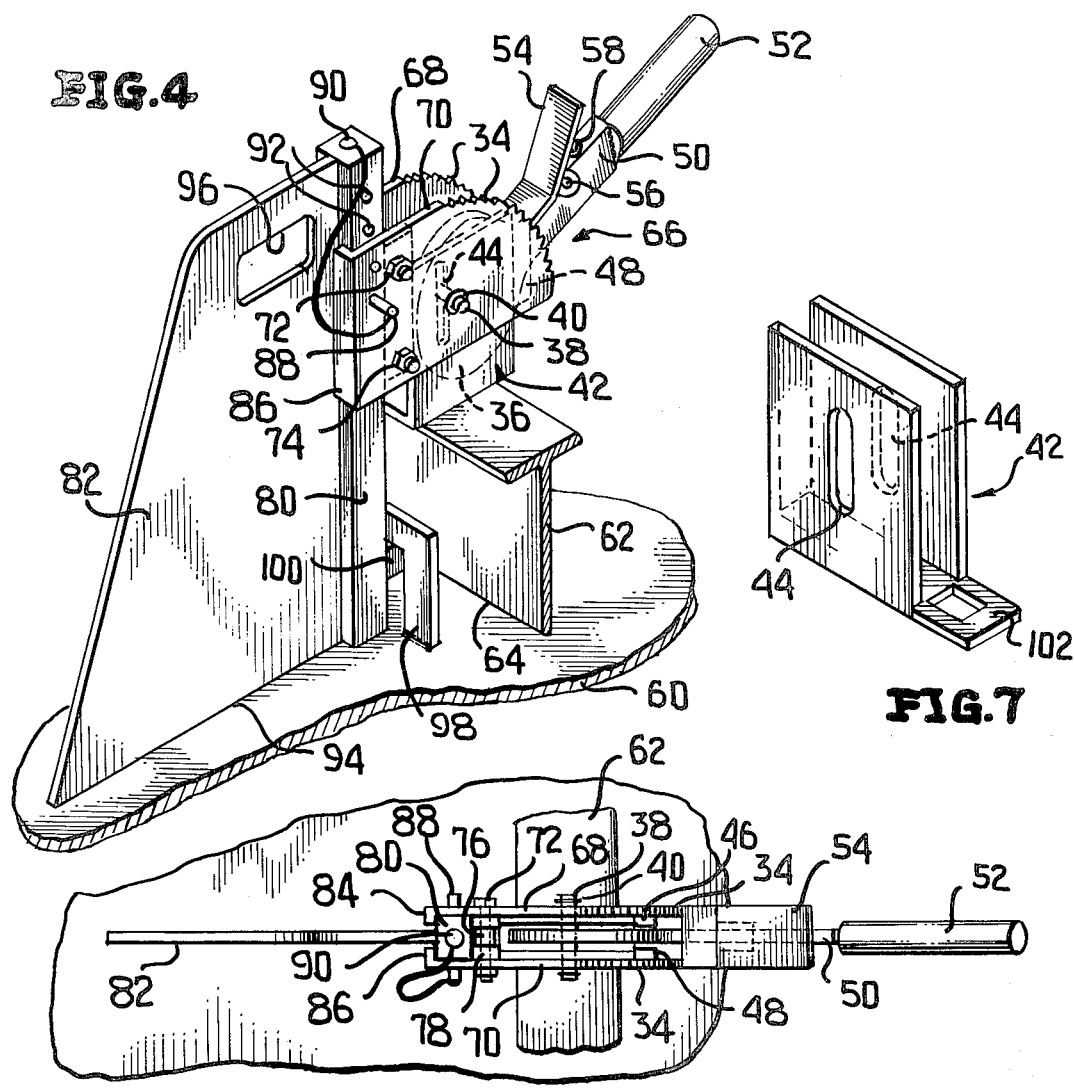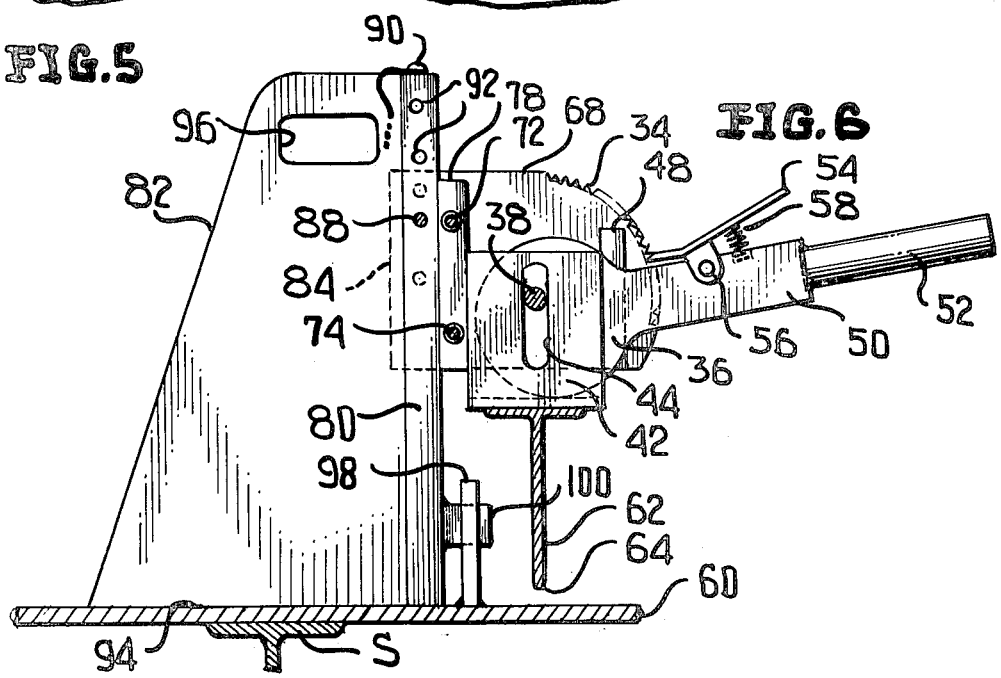

MECHANISM FOR POSITIONING WORKPIECES

This invention relates to mechanisms which position and hold heavy workpieces in a plurality of positions. More particularly, this invention relates to such mechanisms wherein the work pieces are aligned by the mechanisms so that the workpieces can be permanently joined by welding, riveting, heat sealing, glueing, etc.

BACKGROUND OF THE INVENTION

Many devices have been invented and employed to align workpieces that are to be attached together and to support these materials during the bonding process. Exemplary of such devices are clamps associated with wood working, furniture manufacturing and small metal-piece work. These devices are generally not designed for the rugged work required in aligning and supporting heavy materials such as I-beams and heavy metal plates during bonding processes such as welding, riveting or heat sealing. Furthermore, these devices are not generally capable of aligning workpieces at a variety of angles. This invention is not only capable of satisfying the needs for smaller or light workpiece work but also those requirements of heavy workpiece work.

The known devices for holding and aligning sheet materials or heavy workpieces so that they may be joined by welding usually required at least two persons to effectively position and hold the materials in a fixed relationship. The use of two persons to perform this single function is an inefficient use of labor. Other devices that perform the same function are not compatible with a range of types or sizes of workpieces. Utilizing these devices may be relatively expensive from the labor and equipment standpoint because it is usually necessary to employ a variety of wedges, clamps or other fixtures. Furthermore, the tools, themselves, may be damaged by each use because of the necessity to bond them to the workpieces.

Exemplary of the state of the art as discussed above are the following patents:
U.S. Pat. No. 1,141,365
U.S. Pat. No. 2,359,530
U.S. Pat. No. 2,660,141
U.S. Pat. No. 3,182,988
U.S. Pat. No. 3,556,508

From the above, it is apparent that there is a need in the art for a mechanism for positioning and holding workpieces which is effective yet easy and quick to employ. This invention fulfills the above needs in the art along with other needs apparent to the skilled artisan once given the following disclosure.

SUMMARY OF THE INVENTION

This invention fulfills the above described need by providing a mechanism for positioning at least a first and a second workpiece, such mechanism comprising a support structure which is attachable to said first workpiece and designed to extend over said second workpiece when said mechanism is employed, a cam rotatably attached to said support structure, a load bearing member which engages said second workpiece and is slidably received by said support structure, wherein the rotation of said cam in a predetermined direction slides said load bearing member relative to said support structure.

In some embodiments of this invention the edge of the cam abuts the load bearing member such that when the cam is rotated, the distance between the axis of rotation of the cam and the load bearing member increases. The axis of rotation of the cam may be a dowel which is attached to the cam and support structure.

In further embodiments of this invention the support structure is comprised of a main support and a pair of side plates which are spaced apart. The cam and the load bearing member may be located within the side plates. The load bearing member may be a U-shaped elongated member whose side surfaces abut the inside surfaces of the side plates. In these embodiments, the edge of the cam would interface with the top surface of the bottom plate of the load bearing member.

This invention provides a simple, sturdy device to facilitate positioning of workpieces. Moreover, because of the simple attachability and detachability of the device to the workpieces, a more efficient method of positioning workpieces so that they can be joined is achieved.

Employment of this invention will reduce the costs of, and simplifies the bonding of workpieces because the mechanism is only secured to one workpiece rather than being secured to each workpiece involved in the joining operation, as necessary when using the prior art devices. Moreover, the durability of the present invention exceeds certain prior art because it avoids structural deformity caused by permanent bonding (welding) to the workpieces as required for employment of certain prior art devices. This invention also provides a simple effective device for positioning even heavy workpieces that can be employed by only one person. This invention also provides a small, simple device that requires little preparation and precision to employ effectively. Furthermore, this invention provides a simple, rugged device that can be used simultaneously or in a series to facilitate work on large workpieces.

This invention will now be described with respect to certain embodiments focusing particularly on welding art thereof in accompanyment of illustrations of such embodiment, wherein:

IN THE DRAWINGS

FIG. 4 is a perspective view of a second embodiment of the invention holding two workpieces disposed perpendicularly.

FIG. 5 is a top view of the embodiment of this invention shown in FIG. 4.

FIG. 6 is a partially sectionalized side view of the embodiment of this invention shown in FIGS. 4 and 5.

FIG. 7 is a perspective view of an embodiment of the load bearing member that can be employed in the practice of this invention.

DETAILED DESCRIPTION OF THE DRAWINGS

Figure 1:
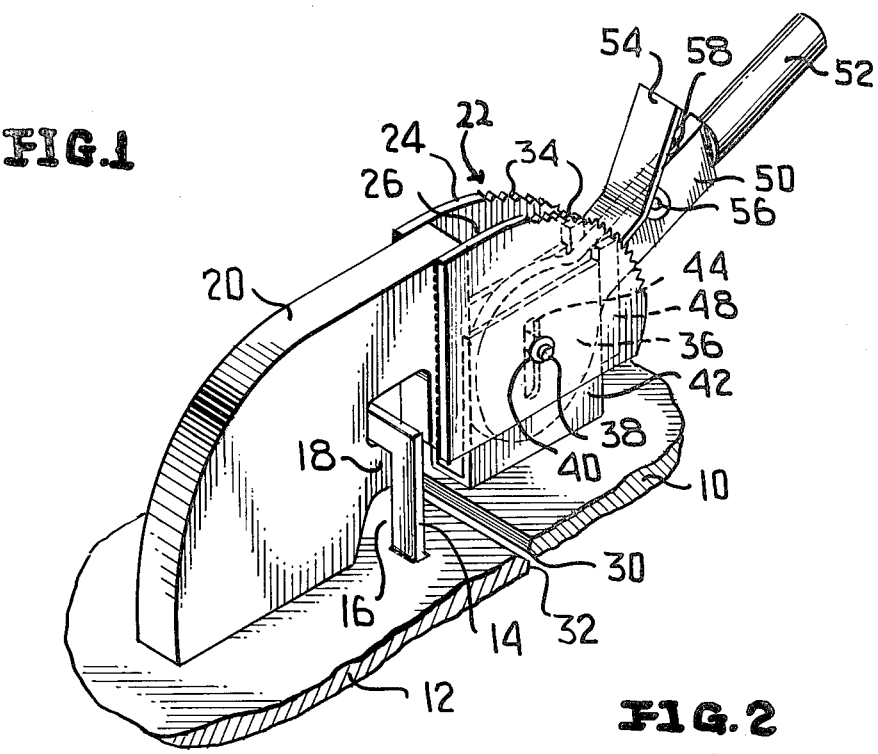
FIG. 1 is a perspective view of one embodiment of this invention holding two workpieces disposed edge to edge.
Figure 2:
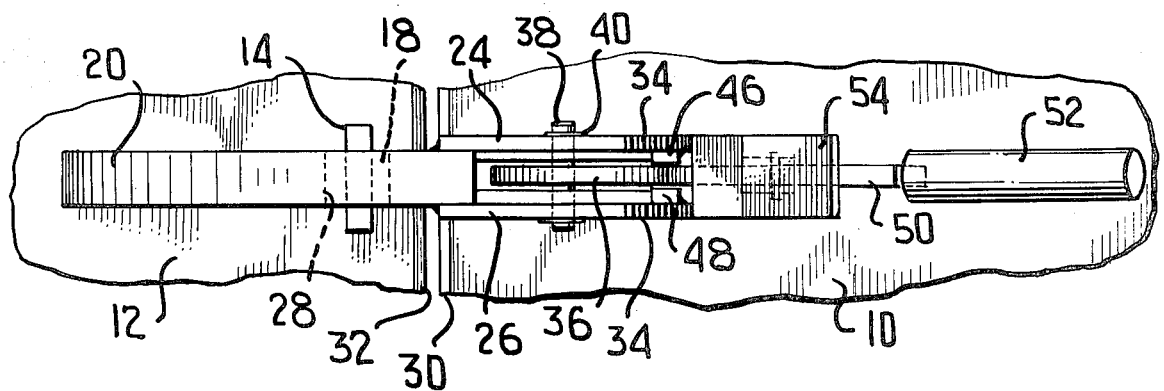
FIG. 2 is a top view of the embodiment of this invention shown in FIG. 1.
Figure 3:
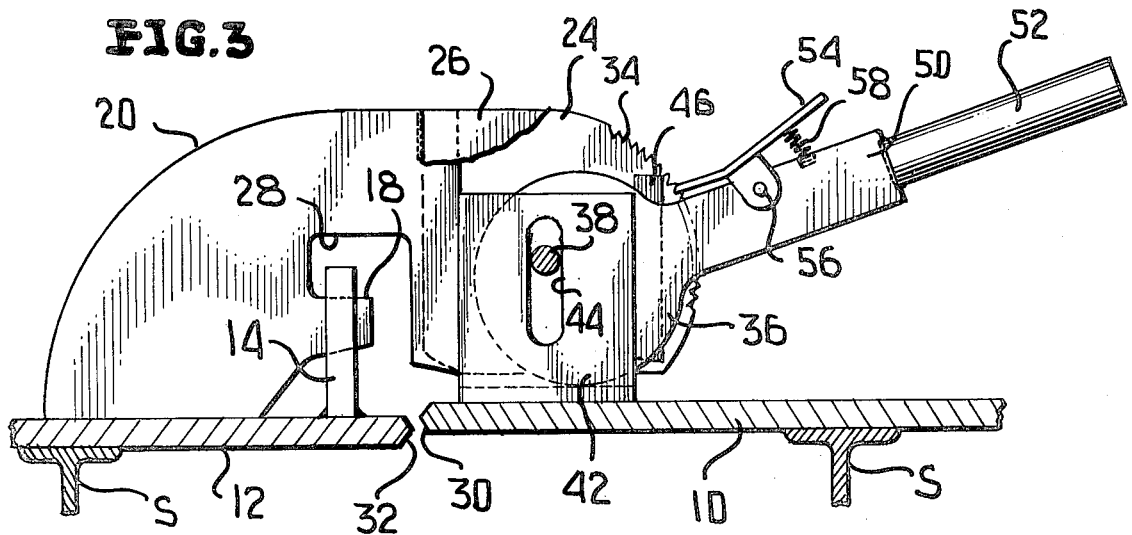
FIG. 3 is a partially sectionalized side view of the embodiment of this invention shown in FIGS. 1 and 2.

Referring to the accompanying drawings, and in particular FIGS. 1, 2 and 3, there is illustrated an embodiment of this invention essentially including main support 20, and housing assembly 22 for aligning workpieces 10 and 12 edge to edge.

Main support 20 and housing assembly 22 are fixedly attached together as shown in the figures. Main support 20 is a solid piece of metal having an opening 28 therein that bridges the edges of workpieces 10 and 12 and protruding neck 18 is a part thereof.

Housing assembly 22 includes side plates 24 and 26, cam 36, load bearing surface 42, dowel 38, cam extension 50, guide bars 46 and 48, handle 52 and ratchet members 54, 56 and 58.

Workpieces 10 and 12 are flat plates supported by support S and having edges 30 and 32, respectively, which are to be welded together. Securing lug 14 is attached to plate 12 to engage protruding neck 18 of main support 20 and may be detached from plate 12 after workpieces 10 and 12 are joined together. Securing lug 14 is a generally rectangular member having orifice 16 therein. Lug 14 is generally disposed at a right angle to the engagable surface of workpiece 12 to be employed with the embodiment of the invention illustrated in FIGS. 1-3. When workpieces 10 and 12 are very large sheets of material, a multiplicity of securing lugs 14 can be attached to workpiece 12, whereby a plurality of embodiments illustrated in FIGS. 1-3 may be employed to engage workpieces 10 and 12. A sturdy, rugged workpiece positioner, provided by this invention, capable of such use will benefit industries employing heavy materials like ship builders, boiler makers and tank manufacturers.

The present invention as illustrated in FIGS. 1, 2 and 3 is secured to workpiece 12 by sliding protruding neck 18 into orifice 16. Neck 18 protrudes from main support 20 into opening 28 and is approximately parallel to workpiece 12. Protruding neck 18 must be compatible to the size of orifice 16 of securing lug 14 in order to secure the present invention to workpiece 12.

Main support 20 is permanently and securely bonded to side plates 24 and 26 of housing assembly 22 such that opening 28 will bridge the edges of any workpieces that are to be joined while being held by this mechanism. This configuration allows sufficient space about abutting or nearly abutting edges 30 and 32 of workpieces 10 and 12 so as not to interfere with the welding of edges 30 and 32.

Side plates 24 and 26 are flat plates in the shape of an approximate quarter-circle and are spaced apart a set distance. Side plates 24 and 26 each have a row of teeth 34 disposed along their curved edges. Guide bars 46 and 48 are attached to the interior faces of side plates 24 and 26, respectively, perpendicular to workpiece 10. Guidebars 46 and 48 assist in channeling load bearing member 42 which is described in detail below.

Load bearing member 42 is a substantially U-shaped elongated member having its lower face extending below side plates 24 and 26 such that it abuts workpiece 10 when the mechanism is properly attached to said workpieces, and having sides extending upwardly into housing 22. Each side of member 42 has a slot 44 therein which slidably receives dowel 38.

Dowel 38 is a cylindrical pin which perpendicularly passes through and is off center to the substantially circular cam 36 to permit the radius of cam 36. This arrangement results in the increasing or decreasing of the distance between the axis of rotation of cam 36 and the bottom plate of load bearing member 42 when cam 36 is rotated. Dowel 38 passes through slots 44 in load bearing member 42. Dowel 38 continues through side plates 24 and 26 and is secured by lockwashers 40 to the outer face of side plates 24 and 26.

Load bearing member 42 slides up and down within housing assembly 22. This movement is channeled by guide bars 46 and 48, the inner surfaces of side plates 24 and 26 and the end of main support 20. As a result of such channeling, the substantially rotational movement of cam 36 translates into the movement of load bearing member 42 in a substantially perpendicular vector relative to workpiece 10. Furthermore, this vertical movement of member 42 is limited by the maximum radius of cam 36 relative to member 42 or in an alternate embodiment, the length of the cord, slots 44, through which dowel 38 passes. To facilitate operation of the invention as illustrated in FIG. 1, 2 and 3 friction reducing entities like bearings or TEFLON may be integrated with cam 36, load bearing member 42 and those surfaces the same abuts and slides relative thereto.

Cam extension 50 protruding from cam 36 has connected on its end a handle 52. Due to this configuration, a leverage force on handle 52 is converted to essentially a rotational force about dowel 38. In the embodiment shown in FIGS. 1-3, extension 50 and cam 36 are a unitary structure. Handle 52 may also be molded as part of the unitary structure including extension 50 and cam 36, or can be molded as a separate piece and attached to cam extension 50. Handle 52 can be of a shape (e.g. a cylinder) that permits the use of implements like a pipe, that can be placed around handle 52 to increase the leverage distance from dowel 38 of the leverage force.

Pawl 54 is provided so that cam 36 can be locked into certain positions. Pawl 54 is attached to cam extension 50 by pivotal hinge 56. Pawl 54 engages complimentary teeth 34, radially disposed on side plates 24 and 26, to lock, by racheting, cam 36 and therefore load bearing member 42 into a fixed position. Spring 58 is attached to, and extends between, cam extension 50 and the lower face of pawl 54. In this embodiment spring 58 may be either a coil or leaf spring. Spring 58 is located on cam extension 50 on the opposite side of pivotal hinge 56 from teeth 34 to hold pawl 54 in engagement with teeth 34. To disengage pawl 54 from teeth 34 in order to change the position of cam 36 and therefore load bearing member 42, appropriate force must be applied to the upper face of pawl 54 in order to compress spring 58, releasing pawl 54 from teeth 34.

FIGS. 4, 5 and 6 represent a second embodiment of the present invention. This second embodiment is very similar in operation and structure to the embodiment depicted in FIGS. 1, 2 and 3, except that this embodiment can be employed to align workpieces 60 and 62 which are disposed at an essentially right angle, instead of being parallel as are the workpieces of FIGS. 1-3. The second embodiment includes support plate 82 and housing assembly 66 which are analogous to main support 20 and housing assembly 22 of the embodiment illustrated in FIG. 1-3 and have the same elements as main support 20 and housing assembly 22. Only the differences between the two embodiments will be described below.

In this embodiment, support plate 82 includes the additional elements of engaging member 80 having spaced holes 92 therein, and which is located along the edge of support plate 82 to which housing assembly 66 is attached, and hand grip 96. Housing assembly 66 includes the additional elements of bolt assemblies 72 and 74 and guide bars 76 and 78 (which are parallel to guide bars 46 and 48).

Workpieces 60 and 62 abut at edge 64 on which the joining operation is to be performed. Housing assembly 66 is attached to support plate 82 by bolt assemblies 72 and 74, pin 88 and lips 84 and 86. The bolts of upper bolt assembly 72 and lower bolt assembly 74 pass through side plates 68 and 70 and guide bars 76 and 78.

In this embodiment the vertical movement of load bearing member 42 is controlled by guide bars 76, 78, 46 and 48 which form a channel within side plates 68 and 70. Guide bars 76 and 78 also form another channel with side plates 68 and 70 and side plate lips 84 and 86 in which slidably receives engaging member 80 therein. Housing assembly 66 may be fixed in one of many positions to engaging member 80 and thus support plate 82 by inserting securing pin 88 through side plate 70, one of a plurality of holes 92 in member 80 and out through side plate 68. The position of housing assembly 66 is adjustable with respect to support plate 82 by removing securing pin 88, sliding housing 66 along member 80 and reinserting pin 88 through another hole 92. To prevent loss of securing pin 88, it may be attached to a string or wire which is connected to the top of member 80 by screw 90.

The stability of the invention can be increased by elongating base 94 of support 82. Hand grip 96 is provided to facilitate use of the present embodiment. For safety purposes, non-functional edges of the elements of the invention may be rounded to prevent any harm to the operator.

Like the embodiment depicted in FIGS. 1-3, the embodiment depicted in FIGS. 4-6 is secured to one workpiece, workpiece 60 in FIG. 4-6, which is supported by support S, by securing lug 98 which is temporarily attached to workpiece 60 and with which protruding neck 100 is slidably engagable. Protruding neck 100 is elevated from and extends parallel to workpiece 60 from engaging member 80.

FIG. 7 illustrates an alternate embodiment of load bearing member 42. This embodiment incorporates protruding lug 102 extending from the workpiece engaging surface of member 42 parallel to the bottom edge of load bearing member 42. Protruding neck 102 may act much in the same manner as protruding neck 18 of FIGS. 1, 2 and 3 and protruding neck 100 of FIGS. 4, 5 and 6 by engaging a lug 14 attached to workpiece 10 or 62, respectively. Also, the protruding neck 102 may act like lug 14 of FIGS. 1, 2 and 3 and lug 98 of FIGS. 4, 5 and 6 whereby it is designed to engage a member which would protrude upward or outward from the workpiece. The use of protruding lug 102 would allow the present invention to slidably engage both workpieces upon which it is acting. This feature gives the present invention greater versatility when work is performed on substantially vertical workpieces. Whereby the weight of the invention is supported by one workpiece.

If desired, an attachment could be designed which would be attached to said load bearing member 42 and which could interface with the abutting portions of the workpiece and member 42. This attachment may be necessary when the portion of the workpiece adjacent member 42 does not have an adequate width to be stabilized by member 42 (for example when the workpiece is a sheet of material on edge.) The attachment can be designed to have a means to engage the workpiece like a groove of predetermined width, and have a flat top surface to be interfaced with the bottom edge of member 42.

The embodiment illustrated in FIGS. 1, 2 and 3 operates as follows. Securing lug 14 is attached to workpiece 12 in the proper location. The mechanism is placed on workpieces 10 and 12 with protruding neck 18 engaging securing lug 14 and the bottom surface of load bearing member 42 abutting workpiece 10 (pawl 54 sould be disengaged from teeth 34). To align workpieces 10 and 12 in the desired relative position, handle 52 and thus cam 36 are rotated downward around dowel 38. This movement causes the distance between dowel 38 and the top surface of the bottom plate of load bearing member 42 to increase driving load bearing member 42 downward in the channel formed by guide bars 46 and 48, plates 26 and 28 and main support 20 as discussed above. As this is occurring, slot 44 in member 42 is also sliding downward with respect to dowel 38 which is fixedly attached to side plates 24 and 26. Of course, as load bearing member 42 is driven downward by the rotation of cam 36, work piece 10 will also be driven downward.

Once edge 30 has been aligned with edge 32, as desired, by the action of load bearing member 42, pawl 54 may be allowed to engage teeth 34 by releasing pressure from spring 58. This action results in locking the elements of housing 22 and therefore workpiece 10 in a desired position relative to workpiece 12. The joining process can then be undertaken. After the joining of edges 30 and 32 is completed, the mechanism can be easily removed by releasing pawl 54 and sliding the mechanism until protruding neck 18 is free from securing lug 14.

The embodiment of this invention illustrated in FIGS. 4-6 operates in the same manner as the embodiment of FIGS. 1-3.

The use of this invention is, of course, not limited in metal workpieces or to positioning the holding workpieces that will be welded together. The invention can be employed to hold workpieces of any type of material and for any purpose.

Once given the above disclosure, many other improvements, modifications and embodiments will become apparent to the skilled artisan. These other improvements, modifications and embodiments are considered to be within the scope of this invention as defined by the following claims:

I claim:

1. A mechanism for positioning at least a first and a second workpiece such that said workpieces are in abutment, said mechanism comprising:
    a support structure which is attachable to said first workpiece and firmly abuts said first workpiece, said support structure including a first portion which extends over said second workpiece when said mechanism is employed, said first portion being comprised of a first pair of spaced side plates,
    a cam rotatably attached to said first pair of side plates,
    a load bearing member which is designed to engage said second workpiece and is slidably engaged by and between said first pair of side plates,
    said cam abutting said load bearing member,
    wherein the rotation of said cam slides said load bearing member relative to said support structure,
    wherein said cam and said load bearing member are designed and arranged such that when said cam rotates in a predetermined direction, the distance between the axis of rotation of the cam and the surface of the load bearing member which engages the second workpiece increases and said second workpiece is pushed by said load bearing member in the direction the load bearing member is moving a distance equal to the aforesaid increase in distance, said load bearing member is comprised of a bottom edge member and a pair of second side plates extending above said bottom edge member, said second pair of said plates interfacing with said first pair of side plates, wherein said cam is located at least in part between said second pair of side plates.

2. A mechanism according to claim 1 wherein said edge of said cam abuts the top surface of said bottom edge member.

3. A mechanism according to claim 2 wherein said bottom edge member is a flat plate.

4. A mechanism according to claim 1 further comprising a handle attached to said cam and a ratchet lever attached to said handle, said first pair of side plates having one edge defined by an arc having the axis of rotation of said cam as the center point thereof, said arc having ratchet teeth thereon, said ratchet teeth, handle and ratchet lever being designed and arranged such that the ratchet lever interfaces with said ratchet teeth during operation of said mechanism to position said load bearing member any one of a number of fixed positions.

5. A mechanism for positioning at least a first and a second workpiece such that said workpieces are in abutment, said mechanism comprising:

a support struture which is attachable to said first workpiece and firmly abuts said first workpiece, said support structure including a first portion which extends over said second workpiece when said mechanism is employed, said first portion being comprised of a first pair of spaced side plates, a cam rotatably attached to said first pair of side plates, a slidable member which is designed to engage said second workpiece and is slidably received by and between said first pair of side plates, said slidable member including a bottom load bearing member having a top and a bottom surface and a second pair of spaced side plates, said second side plates extending upward from said load bearing member, said bottom surface of said load bearing member defining the bottom surface of said sliding member, said cam abutting the top surface of said load bearing member, said cam being located between said second pair of side plates, wherein the rotation of said cam slides said slidable member relative to said support structure, wherein the vertical movement of the slidable member is guided by said first pair of side plates and wherein the lateral movement of said slidable member is limited by said first pair of side plates, wherein said cam and said slidable member are designed and arranged such that when said cam rotates in a predetermined direction, the distance between the axis of rotation of the cam and the bottom surface of the load bearing member which engages the second workpiece increases and said second workpiece is pushed by said load bearing member in the direction the load bearing member is moving a distance equal to the aforesaid increase in distance.

6. A mechanism according to claim 5 further comprising a dowel, said dowel extending through said cam, said first pair of side plates and said second pair of side plates, said dowel being rotatably attached to said first pair of side plates, said second pair of side plates having slots therein, said dowel being slidably received in said slots.

7. A mechanism according to claim 6 further comprising guide bars attached to the inner sides of said first pair of side plates, said guide bars interfacing with said slidable member to guide the slidable member in the vertical direction.

8. A mechanism according to claim 7, wherein said support structure includes a protruding neck and an opening over the location where said workpieces abut, wherein said protruding neck extends into the opening of said support structure and is designed to attach to a lug which has been affixed to said first workpiece.

9. A mechanism according to claim 8 wherein said load bearing member is a flat plate.

10. A mechanism according to claim 5 further comprising a handle attached to said cam and a ratchet lever attached to said handle, said first pair of side plates having one edge defined by an arc having the axis of rotation of said cam as the center point thereof, said arc having ratchet teeth thereon, said ratchet teeth, handle and ratchet lever being designed and arranged such that the ratchet lever interfaces with said ratchet teeth during operation of said mechanism to position said load bearing member in any one of a number of fixed positions.

11. A mechanism according to claim 6, wherein said support structure has a first flat surface which abuts said first workpiece when said mechanism is employed, said load bearing member having a flat bottom surface, said slot in said second pair of side plates running perpendicular to said bottom surface of said load bearing member.

12. A jack mechanism for positioning a first large metal member in abutment with a second large metal member for the purpose of connecting the two metal members, said jack mechanism comprising:

a support structure which is attachable to said first metal member and firmly abuts said first metal member, said support structure including a first portion which extends over said second metal member when said mechanism is employed, said first portion being comprised of a first pair of spaced side plates, a cam rotatably attached to said first pair of side plates, a slidable member which is designed to engage said second metal member and is slidably received by and between said first pair of side plates, said slidable member including a bottom load bearing member having a top and a bottom surface and a second pair of spaced side plates, said second side plates extending upward from said load bearing member, said bottom surface of said load bearing member defining the bottom surface of said sliding member, said cam abutting the top surface of said load bearing member, said cam being located between said second pair of side plates, wherein the rotation of said cam slides said slidable member relative to said support structure, wherein the vertical movement of the slidable member is guided by said first pair of said plates and wherein the lateral movement of said slidable member is limited by said first pair of side plates, wherein said cam and said slidable member are designed and arranged such that when said cam rotates in a predetermined direction, the distance between the axis of rotation of the cam and the bottom surface of the load bearing member which engages the second metal member increases and said second metal member is pushed by said load bearing member in the direction the load bearing member is moving a distance equal to the aforesaid increase in distance.

13. A mechanism according to claim 12 further comprising a dowel, said dowel extending through said cam, said first pair of side plates and said second pair of side plates, said dowel being rotatably attached to said first pair of side plates, said second pair of side plates having slots therein, said dowel being slidably received in said slots.

14. A mechanism according to claim 13, further comprising guide bars attached to the inner sides of said first pair of side plates, said guide bars interfacing with said slidable member to guide the slidable member in the vertical direction.

15. A mechanism according to claim 14, wherein said support structure includes a protruding neck and an opening over the location where said large metal members abut, wherein said protruding neck extends into the opening of said support structure and is designed to attach to a lug which has been affixed to said first metal member.

16. A mechanism according to claim 15, wherein said load bearing member is a flat plate.

17. A mechanism according to claim 16, further comprising a handle attached to said cam and a ratchet lever attached to said handle, said first pair of side plates having one edge defined by an arc having the axis of rotation of said cam as the center point thereof, said arc having ratchet teeth thereon, said ratchet teeth, handle and ratchet lever being designed and arranged such that the ratchet lever interfaces with said ratchet teeth during operation of said mechanism to position said load bearing member in any one of a number of fixed positions.

18. A mechanism according to claim 17, wherein said support structure has a first flat surface which abuts said first metal member when said mechanism is employed, said load bearing member having a flat bottom surface, said slot in said second pair of side plates running perpendicular to said bottom surface of said load bearing member.

* * * * *